United States Patent
Lakshminarayan et al.

(10) Patent No.: US 8,549,004 B2
(45) Date of Patent: Oct. 1, 2013

(54) ESTIMATION OF UNIQUE DATABASE VALUES

(75) Inventors: Choudur Lakshminarayan, Austin, TX (US); Ramakumar Kosuru, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 191 days.

(21) Appl. No.: 12/895,683

(22) Filed: Sep. 30, 2010

(65) Prior Publication Data

US 2012/0084287 A1  Apr. 5, 2012

(51) Int. Cl.
*G06F 7/00* (2006.01)
*G06F 17/30* (2006.01)

(52) U.S. Cl.
USPC .......................................................... 707/737

(58) Field of Classification Search
USPC ................................. 707/735–740
See application file for complete search history.

(56) References Cited

U.S. PATENT DOCUMENTS

| | | | |
|---|---|---|---|
| 5,870,752 A | 2/1999 | Gibbons et al. | |
| 6,263,345 B1 | 7/2001 | Farrar et al. | |
| 6,438,552 B1 | 8/2002 | Tate | |
| 6,477,523 B1 | 11/2002 | Chiang | |
| 2002/0143755 A1* | 10/2002 | Wynblatt et al. | 707/3 |
| 2007/0156842 A1* | 7/2007 | Vermeulen et al. | 709/217 |
| 2007/0271218 A1* | 11/2007 | Lim et al. | 707/2 |
| 2008/0297354 A1* | 12/2008 | Foley et al. | 340/572.4 |

* cited by examiner

*Primary Examiner* — Hosain Alam
*Assistant Examiner* — Navneet K Ahluwalia (57) ABSTRACT

Estimation of unique values in a database can be performed where a data field having multiple information values is provided in the database. The data field can be partitioned into multiple intervals such that each interval includes a range of information values. An interval specific Bloom filter can be calculated for each of the multiple intervals. A binary Bloom filter value can be calculated for an information value within an interval specific Bloom filter. The binary Bloom filter value can represent whether the information value is unique. A number of unique values in the database can be determined based on calculated binary Bloom filter values.

20 Claims, 4 Drawing Sheets

ESTIMATION OF UNIQUE DATABASE VALUES

BACKGROUND

Relational databases are used by many enterprises in many database management systems. Relational database management systems are often used with data warehouses where vast amounts of data can be stored and processed. Recently, data mining applications have been developed for identifying and interpreting patterns in databases.

Data mining applications can use database query optimizers. More specifically, histogram statistics can be used to more accurately estimate a number of rows and unique entry counts (UECs), where a UEC is the number of unique values represented within any particular interval of a histogram.

Histograms are also used for developing statistics to describe the distribution of data in the database tables. For example, gathering accurate statistics about the data in the tables can be useful in estimating predicate selectivity for forming optimal SQL queries. A histogram can be used to group data attribute values from the table(s) into subsets and to approximate true attribute values as well as frequency distributions. Because histograms are generally summaries of much larger distributions, estimations based on histograms may still include errors. However, for most real-world databases and applications, histograms can be produced with acceptably low error estimates while occupying a reasonably small storage space.

DETAILED DESCRIPTION

Reference will now be made to the examples illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

Some current database systems employing histograms have various inefficiencies. For example, updates to the database between successive histogram recomputations can cause poor estimations inside a query optimizer. Also, prior systems can be computationally intensive and expensive in recomputing histograms that are up-to-date for a database when the database is updated.

Probabilistic counting methods have been proposed which use hashing on bitmaps and probablistic reasoning. For example, an existing database management system (DBMS) uses sampling and hashing based methods for updating statistical summary information, maintaining a "synopsis" of the data, and periodically flushing values having a specific bit pattern (e.g., 0, 10, 010, etc.). Some previous probabilistic counting methods may be used in a dynamic context. For example, a database technology can use structures, such as zone-maps, to avoid construction of indexes. Zone filters and zone indexes are sometimes viewed as side-effects of the load process of this technology. Some current database systems use an adaptive linear-weighted combination estimator based on an extensive suite of estimators.

Unfortunately, current systems and approaches do not work well across a variety of situations. For example, performance often depends on the degree of skewness of the frequencies of the unique values in the dataset. The more uniform the frequencies are distributed, the less skewness there is in the data and vice-versa. A hybrid estimator has been posited which switches between two estimators based on skewness. By construction, the hybrid estimator restricts the choice to one of two estimators. Another option uses a weighted combination of two estimators. Theoretically this option may include an infinite family of estimators, one for each value of the weight. Another existing estimator in combines the Schlosser estimator, which is suitable when the skewness is high, and the (un)smoothed Jackknife estimator, which is suitable under low skewness. This estimator uses weights based on observed skewness in a sample. A linear combination of the two estimators provides a mechanism to incorporate skewnesses in the mid-ranges of skewnesses. Other estimators have been derived which are composites of Schlosser and Jackknife estimators, as well as an adaptive estimator (AE), and guarantee error estimator (GEE) to yield an estimator that switches among a set of as many as six estimators for various skewness ranges.

However, previous approaches to probabilistic counting and estimation of unique value entry counts (or simply unique entry counts (UECs)) are based on technologies other than Bloom filters. A Bloom filter-based approach can provide different and improved functionality over previous approaches. Bloom filters are well analyzed entities and are used in analysis of data packets in network data as well as security related applications, such as password checkers. Bloom filters can also be used, such as by a data loader, to compute unique entry counts.

Bloom filters can provide a space-efficient probabilistic data structure that can be used to test whether an element is a member of a set. False positives are possible, but false negatives are not. Typically, elements can be added to the set, but not removed (though this can be addressed with a counting filter). The more elements that are added to the set, the larger the probability of false positives.

An empty Bloom filter is a bit array of m bits, all set to 0. To use a Bloom filter, k different hash functions can be defined, each of which maps or hashes some set element to one of the m array positions with a uniform random distribution. To add an element to the Bloom filter, the element is fed to each of the k hash functions to get k array positions. The bits at each of these positions can be set to 1. To query for an element (i.e., test whether the element is in a set), the element can be fed to each of the k hash functions to get k array positions. If any of the bits at these positions are 0, the element is not in the set. If the element were in the set, then each of the bits at the k array positions would have been set to 1 when the element was inserted. If each of the bits are 1, then either the element is in the set, or the bits have been set to 1 during the insertion of other elements. Designing k different independent hash functions can be prohibitive for a large k. For a good hash function with a wide output, there ought to be little if any correlation between different bit-fields. A good type of hash can be used to generate multiple "different" hash functions by slicing output of the hash into multiple bit fields. Alternatively, k different initial values (such as 0, 1, . . . , k−1) can be passed to a hash function that takes an initial value or adds (or append) these values to a key. For larger m and/or k, independence among the hash functions can be relaxed with negligible increase in a rate of false positives. For example, enhanced double hashing or triple hashing, variants of double hashing, etc. can be used to derive k indices using simple arithmetic on two or three indices computed with independent hash functions.

While risking false positives, Bloom filters can provide a strong computer storage space advantage over other data structures for representing sets, such as self-balancing binary search trees, tries, hash tables, simple arrays, or linked lists of entries. Many of these other types of data structures store at least the data items, which can range anywhere in size from a small number of bits, for small integers, to an arbitrarily large number of bits, such as for strings. A Bloom filter with 1% error and an optimal value of k often uses only about 9.6 bits per element regardless of the size of the elements. This benefit can arise at least in part from the compactness of Bloom filters and at least in part from the probabilistic nature of Bloom filters.

Estimation of unique values in a database can be performed where a data field having multiple information values is provided in the database. The information values can be data elements or data values which may be in a row or column in the database. The data field can be partitioned into multiple intervals such that each interval includes a range of information values. An interval specific Bloom filter can be calculated for each of the multiple intervals. A binary Bloom filter value can be calculated for an information value within an interval specific Bloom filter. The binary Bloom filter value can represent whether the information value is unique. A number of unique values in the database can be determined based on calculated binary Bloom filter values.

The systems and methods described can use Bloom filters to perform a fast computation of unique entry counts in the data field. More specifically, the systems and methods enable estimation of unique entry count of a column in a relational database engine with a Bloom filter, but without using typically used "group-by" and "sort" operators as in various DBMS (Database Management System) engines such as the Nonstop SQL/MX engine and Hewlett Packard's Neoview engine. The systems and methods can operate much faster than the "group-by" based methods to estimate unique entry count and row count estimates for a given data interval. For bulk inserts, a histogram can be incrementally updated per interval of information by storing a corresponding Bloom filter. As one example, the systems or methods can be adapted to compute interesting characteristics of data at the time of data loading or by a text miner to find unique words and/or frequencies of the unique words. As used herein, a "word" can refer to a character or a string of characters, including any type of letter, number, etc. or combinations thereof, and need not be a dictionary-defined word.

Figure 1:
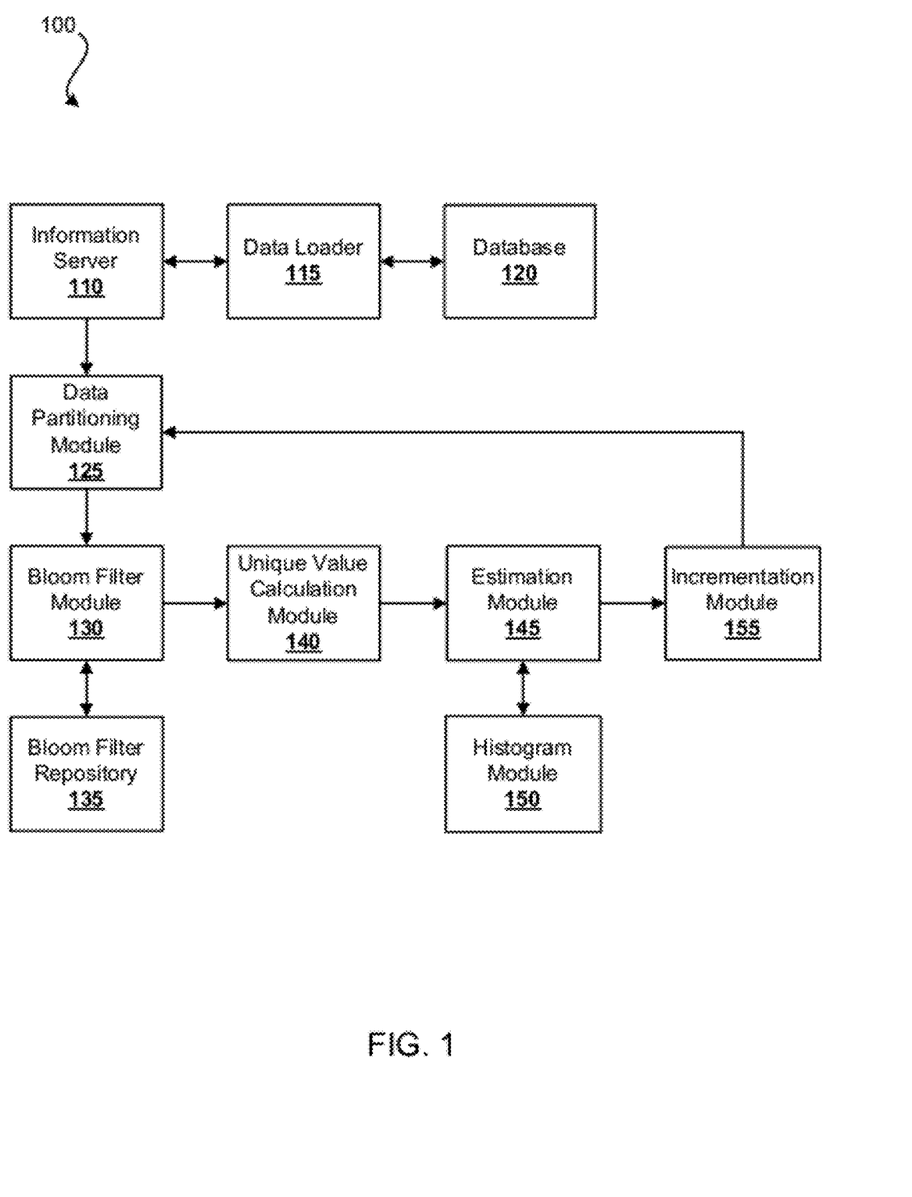
FIG. 1 is a block diagram of a system for estimating unique values in a database in accordance with an example.

Referring to FIG. 1, an example of a system 100 for estimating unique values in a database will be briefly described to further introduce the use of Bloom filters in computing unique entry counts (UECs). An information server 110 is provided for receiving information values over a computing network (not shown). A database 120 can be in communication with the information server. The database can be configured to store the information values received by the information server. A data loader 115 can load the information values from the information server to the database to be stored. A data partitioning module 125 can partition the information values into intervals. In one aspect, each interval may comprise a range of information values. For example, a database or table column may comprise the last names of clients of a business. If the column contains 10,000 names, the names in the column may be arbitrarily divided into groups of 100 or 1,000 for processing by the system.

The system can include a Bloom filter module 130. The Bloom filter module can compute an interval specific Bloom filter for the intervals partitioned by the data partitioning module. A unique value calculation module 140 can be in communication with the Bloom filter module and can calculate a binary Bloom filter value for an information value within an interval specific Bloom filter. As described above, the binary value may be a 0 or a 1 at each of the k array positions. The binary Bloom filter value can represent whether the information value is unique.

An estimation module 145 can estimate a number of unique values in the database 120 based on calculated binary Bloom filter values. The estimation module can include or be in communication with an incrementation module 155. The incrementation module can incrementally estimate a number of unique values in the database when additional data values are added to the database, as will be described in further detail below.

In one example, a Bloom filter repository 135 is in communication with the information server 110 and is configured to store the interval specific Bloom filters generated by the Bloom filter module. In this example, the Bloom filter module can reuse a stored interval specific Bloom filter when additional data values are inserted to the database. The incrementation module can then estimate the number of unique values in the interval or across all intervals.

Figure 2:
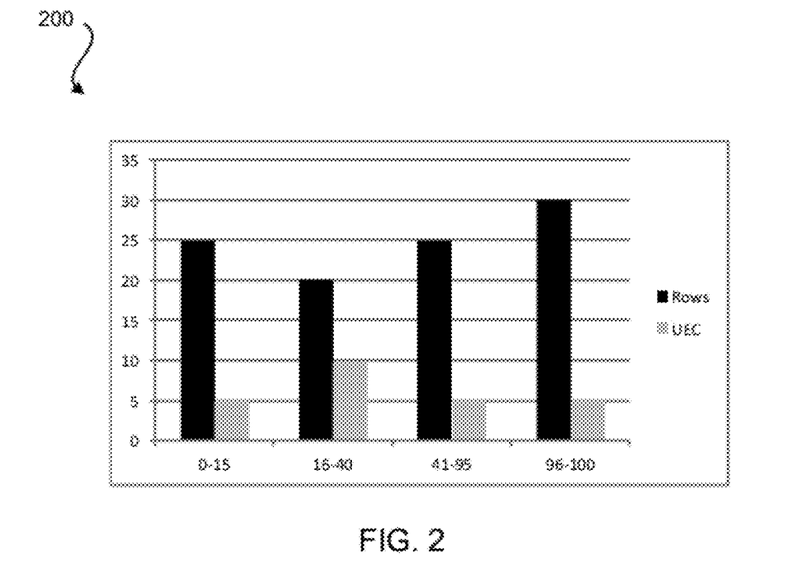
FIG. 2 is a histogram representing unique entry count and row count across different intervals in a column in a database in accordance with an example.

One example use of the system is the creation of histograms representing the data or a subset of the data within the database 120. For example, a histogram may be used to plot density of data or for density estimation. A shape of a histogram distribution can represent information such as the probability distribution of the data. The system 100 can include a histogram module 150 to generate histograms. In one example, the histograms generated can be based on the estimation of the number of unique values within a database column or across multiple columns. An example histogram 200 including (UEC, row count) pairs in different intervals is illustrated in FIG. 2.

The system described above can be further understood according to the more detailed following discussion. The system can provide a Bloom filter-based technique for estimating a (UEC, row count) pair per interval without using computationally expensive group-by and sort operations. The system can also enable incremental updates of UEC count by storing the previously used Bloom filter, such as on a disk or other computer readable storage medium. This is contrasted with current update statistics operations, which are typically not incremental in nature. Also, the system can be employed to calculate interesting metrics when a data loader is populating a structured query language (SQL) table. For example, a number of distinct words in a text may be estimated. More specifically, a number of distinct words across a VARCHAR column can be quickly estimated by a load process.

The aforementioned Nonstop SQL/MX and Neoview database engines use a cost based optimizer to compute costs based on sizes of the tables, selectivity of local predicates, selectivity of join predicates, and an estimated number of groups in a group-by expression. These cardinality estimates can be based on histograms of unique entry count (UEC) estimates of a column or columns that appear in the predicates and/or elsewhere in a SQL query. The histogram collection is performed through an update statistics statement that computes value pairs (UEC, row count) for disjoint intervals over a range of the column values. The update statistics statement can be a time consuming operation. The update statistics statement can be a memory, CPU (central processing unit), and I/O (input/output) intensive operation that uses a group-by as well as a sort operation to compute the UEC of a column. The DBMS engine reduces the cost of this operation by using sampling to reduce a size of the input and improve resource usage. The DBMS reduction introduces estimation errors due to employed techniques such as the Jackknife extrapolation or estimation. The present Bloom filter-based approach reduces the estimation errors by sampling more input while avoiding significant additional costs.

For a given column of a SQL table and a given number of intervals within the SQL table, (UEC, row count) pairs can be estimated for each interval while improving performance relative to existing statistics collection methods. The estimation can be performed without sacrificing accuracy and can be independent of data distributions. For example, the estimation works even if there is skew in the input for a given column.

Figure 3:
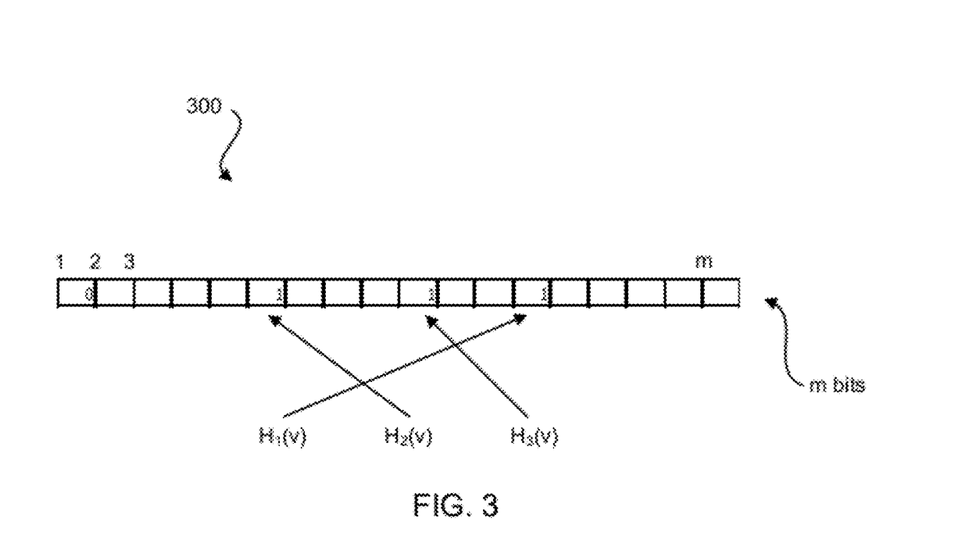
FIG. 3 is a diagram of a Bloom filter in accordance with an example.

A Bloom filter as used in the present technology may be established according to the following discussion and understood with reference to Bloom filter 300 in FIG. 3. Let there be an m bit vector where each bit in the vector is set to zero. This vector can be called a Bloom filter. Let there be n input values to encode in the Bloom filter. In other words, n can represent the number of values per interval, since each Bloom filter can be an interval specific Bloom filter. Assume that there are k hash functions. Each hash function $h_i$ can take a column value v as input and outputs a number in a range from $\{1 \ldots m\}$. The $h_i(v)^{th}$ bit in the vector can be set to one (1) for each i ranging from 1 to k.

Bloom filters can be used to test membership queries. To test if a value V is already present in the filter, the k hash functions can be applied to the value. If any of the k bits from the filter return a zero, then the value V does not exist in the filter (i.e., the value V is not a member of the set of values in the interval). If all bits return a one, then the value probably is a member of the set of values in the interval and thus is likely not unique. There is a small but non-zero probability that the value does not exist (i.e., is not a member of the set), but the existence of the value can be assumed because all k bits are set to one. The false positive probability p can be computed using the following formula:

$$p = \left(1 - e^{\frac{-kn}{m}}\right)^k$$

For a desired set of p, n, and k values a number of bits (m) per interval can be calculated using the formula:

$$m = -\frac{kn}{\ln\left(1 - p^{\frac{1}{k}}\right)}$$

For example, if there are one million column values, then n=1,000,000. If a desired probability of false positive is 0.1%, p can be selected as p=0.001. If a number of hash functions to use in the Bloom filter is five, then k=5. Using these figures, the number of bits (m) per interval is 16.48 MB. If the probability p of false positives is increased to p=0.01, then m is 9.39 MB. Thus, the more memory there is available for the Bloom filter, the more accurate the performance of the Bloom filter is (i.e., the probability of false positives is decreased).

Bloom filter performance can be dependent on availability of fast hash functions. Construction of an example hash function is as follows. An array S of 255 random values can be constructed. The random values can be obtained from a random value list, such as may be available online, or can be generated by a pseudo random number generator. In one aspect, the pseudo random number generator can have a restriction that each generated value is in the range $\{0 \ldots 255\}$ inclusive so that the pseudo random number generator needs at most one byte in storage. In an example where hash function takes a string of characters as input and returns a 64 bit unsigned integer as output, the following pseudo-code can represent an exemplary hash function:

---

Unsigned long Hash1(char * str)

```
{
// use identity I & 7 = I mod 8 where & is bitwise AND and mod is a modulo
function
    Unsigned char h[ ]={0,15,127,255,31,131,199,249};
// h is 8-byte character array populated with random values; each value is
less
// than 256.
    for(int I = 0; str[i] !='\0'; i++)
    {
        H[i&7] = S[(h[i&7]) ^ (str[i])];
    }
// ^ : bit wise XOR
    Return (h[3] << 24) + (h[2] << 16) + (h[1] << 8) + h[0] +
        (h[6] << 48) + (h[5] << 40) + (h[4] << 56) + (h[7] << 32);
}
```

---

The value returned by the hash function can be transformed and used as an index into the above-described m-bit Bloom filter to determine whether an input value has been "seen" before or not (i.e., to determine whether the input value is unique as compared with other values in a table).

In order to determine a unique entry count, as well as to further facilitate construction of a histogram from computed unique entry counts, multiple methods are provided. A first method, referred to herein as "FASTHIST" can compute (UEC, row count) pairs for each interval. A second method, referred to herein as "NCR", can incrementally update the (UEC, row count) pair per interval after a bulk insert into the table.

The FASTHIST method can be used for computing (UEC, row count) pairs and can proceed as follows. (1) Without loss of generality, input can be a table of one column. The input can be partitioned into R intervals: $B_1, B_2, \ldots, B_R$. The intervals can be constructed such that any input value in interval $B_i$ is less than any input value in interval $B_j$ for $0 < i < j \leq R$. Thus, there can be a range partition of R intervals over the column values. In one aspect, no ordering of values within an interval is assumed. (2) A Bloom filter can be built for each interval. (Parallel computation of Bloom filters for different intervals is acceptable). (3) For each interval the FASTHIST method can continue as follows. The next value v can be obtained and $h_i(v)$ can be computed for i=1 to k. The method can continue with checking to determine whether each of the corresponding k bits in the Bloom filter are set to one. If each of the corresponding k bits in the Bloom filter are set to one (i.e., no zeroes are seen), the row count in the (UEC, row count) pair can be incremented. If each of the corresponding k bits in the Bloom filter are not set to one (i.e., at least one zero is seen), both the UEC and the row count in the (UEC, row count) pair can be incremented. Also, the $h_i(v)^{th}$ bit (for i=1 to k) can be set to one.

The NCR method can be used to incrementally update the UEC count per interval after a bulk insert into the table. (I) At the end of step (3) in the FASTHIST method, an interval specific Bloom filter can be stored on a computer readable storage medium, such as a disk or other suitable medium. The (UEC, row count) pair per interval can also be stored. In one example, the (UEC, row count) pair per interval can be stored in a along with the interval specific Bloom filter. (II) Let T" be the new set of rows inserted into the table. For example, the new set of rows can be a new set of rows in a same column or columns as considered during the FASTHIST method. (III) A range partition of the data from T" can be created with R intervals similarly as was done in the FASTHIST method. (IV) For each interval, the corresponding Bloom filter can be loaded and step (3) of the FASTHIST method can be performed on the interval using the corresponding Bloom filter.

Implementation and results of the Bloom filter performance can be demonstrated with the following examples. In one example, a Bloom filter was written and data was taken from a Transaction Processing Performance Council (TPC) Benchmark™ H (TPC-H) LINEITEM table. The hash functions were constructed similarly as has been described above.
Experiment 1:

TABLE 1

| n (row count/ Interval) | Actual UEC | UEC Est. m/n = 64 bits | UEC Est. m/n = 16 bits | UEC Est. m/n = 8 bits |
|---|---|---|---|---|
| 1048571 | 1021589 | 1021572 | 1020570 | 1013032 |
| 5000000 | 4429912 | 4429794 | 4427098 | 4407740 |
| 8000000 | 6605644 | 6605364 | 6602039 | 6578690 |

Referring to Table 1, 8 million column values were samples out of a L_PARTKEY column in the TPC-H table. The UEC was varied from approximately 85% to 97% by further sampling the 8 million values. Various Bloom filters were built for different sizes of input intervals varying from 8 million to 1 million values in size. The value m/n was also varied from between 64 bits to 8 bits. Table 1 shows the actual UECs as well as the estimated UEC values for various Bloom filters. As shown by Table 1, the error in estimation that occurs due to false positives decreased as a size of Bloom filter (m/n) increased. In this experiment, 8 hash functions were used (i.e., k=8).
Experiment 2:

TABLE 2

| Method | Memory (MB) | m/n bits | k | Sample Size | Elapsed Time (min:sec) | UEC Est. | Est. Error |
|---|---|---|---|---|---|---|---|
| Update Statistics | 1200 | 0 | 0 | 100% | 23:14 | 49209857 | 0 |
| Bloom 1 | 451 | 16 | 6 | 100% | 10:36 | 49209407 | 0.0001% |
| Bloom 2 | 254 | 8 | 9 | 100% | 13:00 | 49209775 | almost 0 |
| Bloom 3 | 154 | 4 | 4 | 100% | 9:35 | 48981296 | 0.46% |
| Bloom 4 | 104 | 2 | 5 | 100% | 9:17 | 48778311 | 0.87% |

Table 2 illustrates results from Bloom filter performance in Experiment 2 on strings of variable length. A SQL table (from column L_COMMENT in the TPC-H table) was created with 206 million rows. Each row was a single column of type VARCHAR (45). On a DBMS system, the update statistics command was run to generate statistics with just one interval. For Bloom filter implementations, the same data was used to calculate the UEC for the interval. In this experiment n=206 million. As shown in Table 2, the Bloom filter performance varied based on the m/n value and the number of hash functions k. In the Bloom 1 example with m/n=16 and k=6, the estimated error was only 0.000001, computation of the UEC took less than half the time of the DBMS computation, and the memory used was nearly ⅓ of the DBMS system. In the Bloom 2 example with a smaller m/n value at m/n=8 but a larger number of hash functions at k=9, the elapsed time was still nearly half of that of the DBMS system while the memory usage was only near ⅕$^{th}$ the DBMS system, but was able to produce nearly the same estimated error. Thus, the Bloom filters and methods described can be used in UEC computation at less cost to enterprises than current systems with substantially the same results.

The update statistics operation of DBMS is accurate if the sample size is 100%, whereas the Bloom filter methods show very small error due to false positives and can operate with a sample size less than 100%. Bloom filter based methods can consume less memory have shorter elapsed times. For larger SQL tables (e.g., ≥1 billion rows) customers typically use a 1% to 20% sample size, which introduces estimation errors in UEC counts with the DBMS update statistics. Bloom filter-based methods can sample at higher rates and with lower estimation errors in such scenarios when compared with the DBMS update statistics.

To hash 4 million string values, the described Bloom filter methods took 8 to 9 seconds. Assuming a current load rate at approximately 8 MB/sec, the methods could be used to sample 50% of input at the time of loading (assuming a 25 char average size for the VARCHAR column) and 50-60 MB of data can be sampled and hashed in approximately 10 seconds. The approaches discussed can also be used to estimate a (UEC, mode) pair over the sampled data by a loader process.

Figure 4:
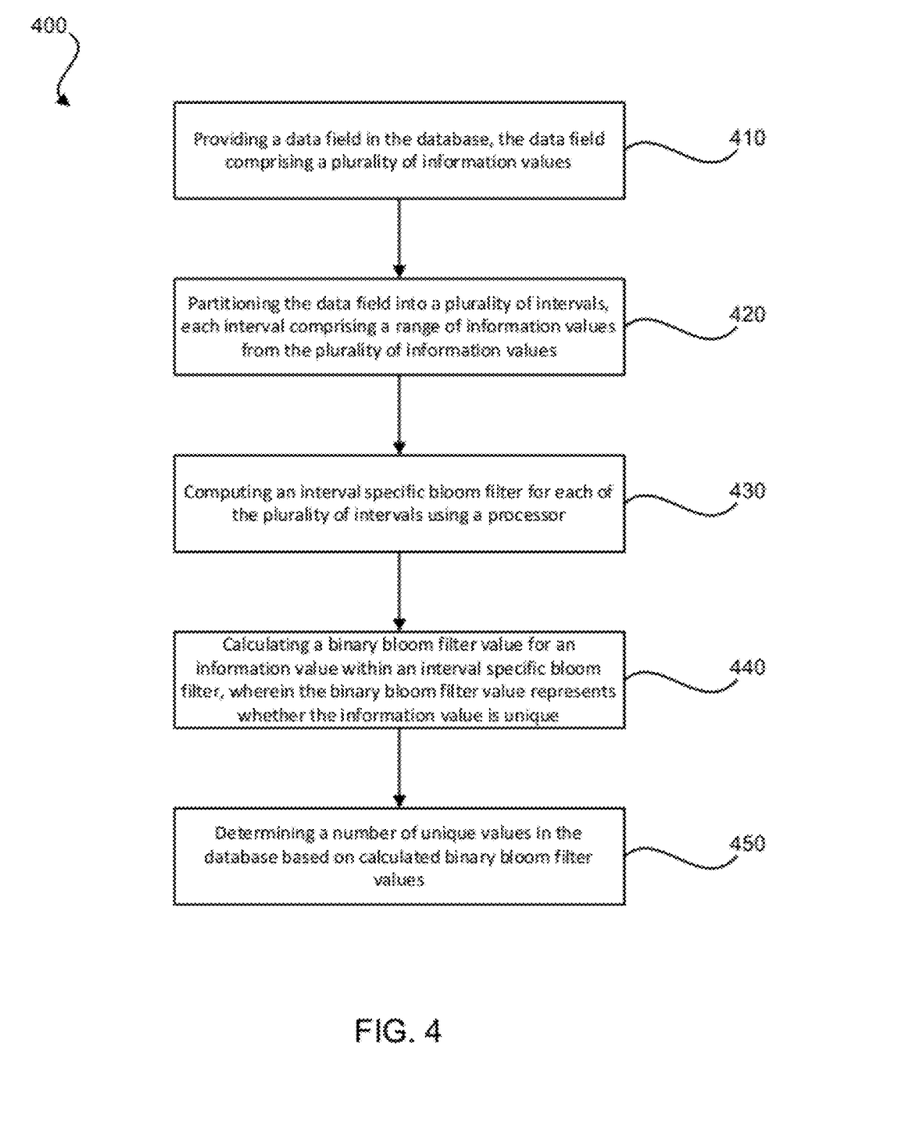
FIGS. 4-5 are flow diagrams of methods for estimating unique values in a database in accordance with an example.
Figure 5:
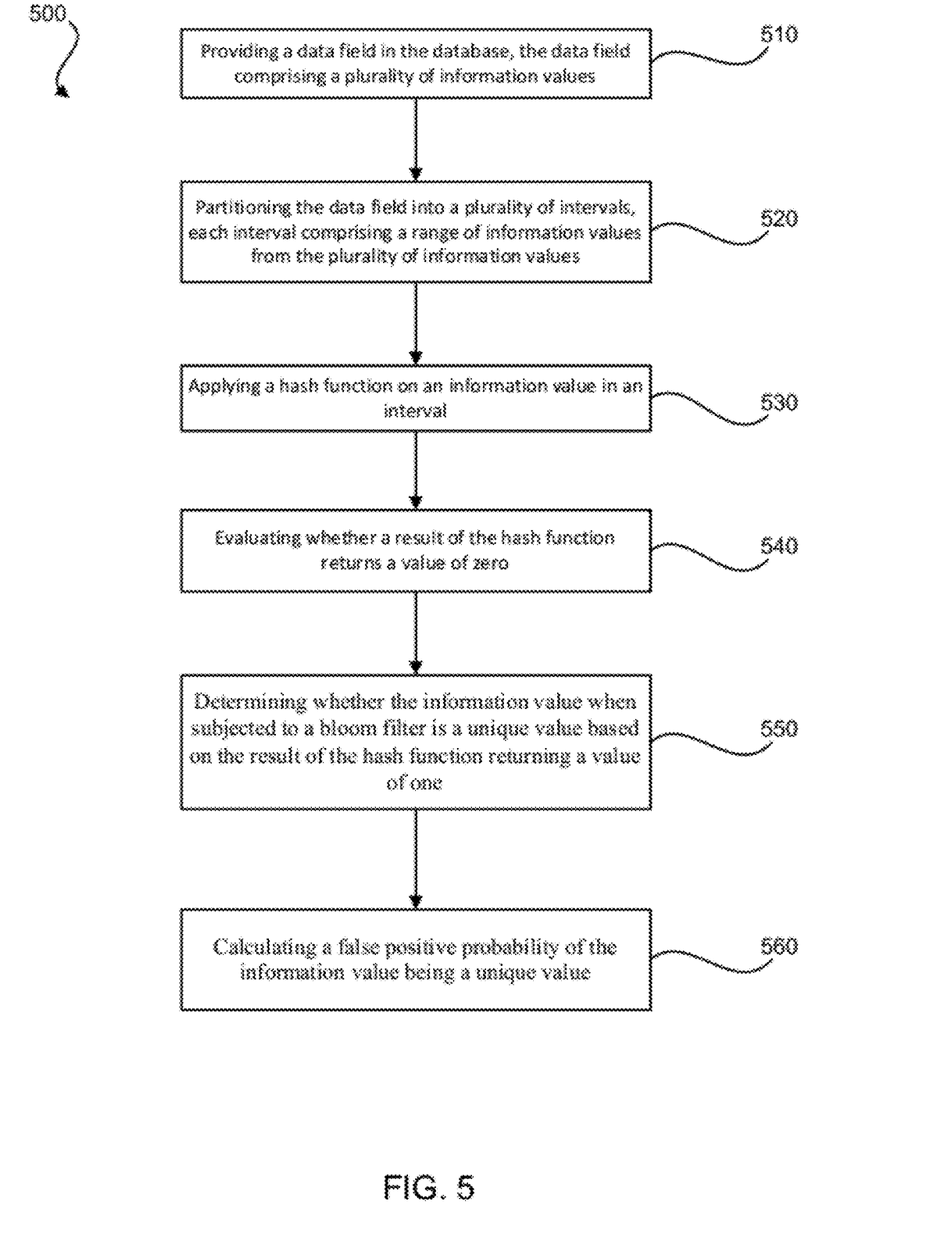

FIGS. 4-5 illustrate additional methods for estimating unique values in a database. For example, FIG. 4 illustrates a flow diagram of a method 400 for estimating unique values in a database which includes providing 410 a data field in the database which includes a plurality of information values. The data field can be partitioned 420 into a plurality of intervals, where each interval comprises a range of information values from the plurality of information values. An interval specific Bloom filter can be computed 430 for each of the plurality of intervals using a processor. The method continues by calculating 440 a binary Bloom filter value for an information value within an interval specific Bloom filter. The binary Bloom filter value can represent whether the information value is unique. The method can also determine 450 a number of unique values in the database based on calculated binary Bloom filter values.

The method 400 can also include storing the interval specific Bloom filter for each of the plurality of intervals. In this example, the method may further comprise the steps of adding a second data field to the database; creating a range partition of the second data field; partitioning the second data field into intervals; loading a corresponding interval specific Bloom filter; calculating a binary Bloom filter value for an information value within an interval specific Bloom filter associated with an interval from the second data field, wherein the binary Bloom filter value represents whether the information value is unique; and/or determining a number of unique values in the database based on calculated binary Bloom filter values.

Other aspects of the method can be derived from the foregoing discussion. For example, the method can include the generation of a histogram based on the unique values, or the incremental determination of a number of unique values in the database when a second data field is added to the database. As other examples, the method can include loading the data field into the database using a data loader performing a load process and estimating the number of unique values in the data field during the load process.

Referring to FIG. 5, a flow diagram of a method 500 is shown for estimating unique values in a database. In a first step 510, a data field is provided in the database which comprises a plurality of information values. In a second step 520, the data field is partitioned into a plurality of intervals, each comprising a range of information values from the plurality of information values. In a third step 530, a hash function is applied on an information value in an interval. In a fourth step 540, a result of the hash function is evaluated to determine whether the result returns a value of zero. In a fifth step 550, the method continues by determining whether the information value is a member of a Bloom filter based on the result of the hash function returning a value of one. In a sixth step 560, a false positive probability is calculated of the information value being a member of the Bloom filter according to the formula:

$$p = \left(1 - e^{\left(\frac{-kn}{m}\right)}\right)^k,$$

where p is the probability, n is a number of information values in an interval, k is a number of hash functions, and m is a number of bits in the Bloom filter.

The method can continue by determining the number of bits m to include in the Bloom filter using the formula:

$$m = -\frac{kn}{\ln\left(1 - p^{\frac{1}{k}}\right)},$$

where the probability p is a desired probability. Also an available computing memory used by the Bloom filter can be increased to increase accuracy of the Bloom filter.

Bloom filter formulation of the estimation of unique values as outlined can involve as much as 100% sampling of column, which can be expensive. To extend the Bloom filter to samples, a Bayesian probability approach can be used in which a statistical inference is made in which evidence or observations are used to update or to newly infer the probability that a hypothesis may be true. More specifically as applied to the Bloom filters, as the Bloom filter counts the number of unique values using hash functions, each application of the filter can be converted into a series of zeroes and ones such that a finite memory register consists of [0,1,0,0,0, 0,1,1,0,0,1,0] (as an example) where "1" implies that a unique value is observed and "0" implies the observed sample has already been detected. The series can be viewed as a series of outcomes of a binary-valued Bernoulli random variable. Since the number of unique values is desired in this example, the sum of Bernoulli outcomes can be modeled as a binomial random variable. The binomial random variable can depend on the parameter "p" which can represent the proportion of unique values in the column. Since "p" can be estimated from the sample, a distribution of "p" may be considered which is typically modeled by a beta distribution parameterized by two parameters (alpha and beta). The binomial distribution in conjunction with the beta distribution can yield a posterior distribution.

The yielded posterior distribution can also be a beta distribution. The posterior distribution can be used to construct Bayesian credible sets. In this setting, a determination can be made as to how many samples to use in order to be 99% confident that the proportion of unique values is greater than or equal to "p", given a sample of size "n" and "k" observed unique values. Because sample skewness can be calculated for the beta distribution, the proportion for various values of skewness can be estimated. Also, the parameters of the beta distribution (alpha, beta) can be estimated by using moments as inputs to the posterior distribution (which is also a function of alpha and beta).

The Bloom filter approach to unique entry count estimation described can provide various positive results. For example, Bloom filters can avoid storing input, unlike current approaches in the Neoview and Nonstop SQL/MX database systems. Bloom filters can enable incremental updates of unique entry counts. The Bloom filter approach can be used with streams, data loaders, and various other technologies. While Bloom filters do produce false positives, the estimation errors can be efficiently managed. Memory used by the Bloom filters can be independent of a data type under observation. For example, the memory used is the same whether the data comprises a text of 45 characters or an integer of 32 bits. Also, more memory with the Bloom filter implementation accords more accuracy and fewer estimation errors.

The methods and systems of certain embodiments may be implemented in hardware, software, firmware, machine-readable instructions, and combinations thereof. Servers and other devices described can include various computing components, such as a memory, a processor, a computer readable storage medium, and the like for carrying storing and processing data and computer-readable instructions. In one embodiment, the method can be executed by software or firmware that is stored in a memory and that is executed by a suitable instruction execution system. If implemented in hardware, as in an alternative embodiment, the method can be implemented with any suitable technology that is well known in the art. In one example hardware implementation, the Bloom filter can be parallelized and the k lookups can be independent.

Also within the scope of an embodiment is the implementation of a program or code that can be stored in a non-transitory machine-readable medium to permit a computer to perform any of the methods described above.

Some of the functional units described in this specification have been labeled as modules, in order to more particularly emphasize their implementation independence. The various modules, engines, tools, or modules discussed herein may be, for example, software, firmware, commands, data files, programs, code, instructions, or the like, and may also include suitable mechanisms. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

While the forgoing examples are illustrative of the principles of the present technology in particular applications, it will be apparent that numerous modifications in form, usage and details of implementation can be made without the exercise of inventive faculty, and without departing from the principles and concepts of the technology. Accordingly, it is not intended that the technology be limited, except as by the claims set forth below.

The invention claimed is:

1. A method for estimating unique values in a database, comprising:
providing a data field in the database, the data field comprising a plurality of information values;
partitioning the data field into a plurality of intervals, each interval comprising a range of information values from the plurality of information values;
computing an interval specific Bloom filter for each of the plurality of intervals using a processor;
applying a hash function on an information value in an interval;
evaluating whether a result of the hash function returns a value of zero;
calculating a binary Bloom filter value for an information value within an interval specific Bloom filter, wherein the binary Bloom filter value represents whether information values are unique;
constructing credible sets to determine how many samples to use to determine a number of unique values; and
determining the number of unique values in the database based on calculated binary Bloom filter values.

2. A method as in claim 1, further comprising storing the interval specific Bloom filter for each of the plurality of intervals.

3. A method as in claim 2, further comprising:
adding a second data field to the database;
partitioning the second data field into intervals;
loading a corresponding interval specific Bloom filter;
calculating a binary Bloom filter value for an information value within an interval associated with an interval specific Bloom filter from the second data field, wherein the binary Bloom filter value represents whether the information value is unique; and
determining a number of unique values in the database based on calculated binary Bloom filter values.

4. A method as in claim 1, further comprising generating a histogram based on the number of unique values.

5. A method as in claim 1, further comprising incrementally determining a number of unique values in the database when a second data field is added to the database.

6. A method as in claim 1, further comprising:
loading the data field into the database using a data loader performing a load process; and
estimating the number of unique values in the data field during the load process.

7. A method as in claim 1, further comprising calculating a false positive probability of whether the binary Bloom filter value is accurate.

8. A system implemented at least in part in program code stored in a non-transitory machine-readable medium and executable by a computer to estimate unique values in a database, the system comprising:
a database in communication with the information server and configured to store the information values received over a computing network;
a data loader executed by the computer and configured to load the information values from the computing network to the database to be stored;
a data partitioning module executed by the computer and configured to partition the information values into intervals;
applying a hash function on an information value in an interval;
evaluating whether a result of the hash function returns a value of zero;
a Bloom filter module executed by the computer and configured to compute an interval specific Bloom filter for the intervals;
a unique value calculation module executed by the computer and configured to calculate a binary Bloom filter value for an information value within an interval specific Bloom filter, wherein the binary Bloom filter value represents whether the information value is unique; and
an estimation module executed by the computer and configured to estimate a number of unique values in the database based on calculated binary Bloom filter values, wherein the estimation module constructs credible sets to determine how many samples to use.

9. A system as in claim 8, further comprising a histogram module configured to generate a histogram based on the estimation of the number of unique values.

10. A system as in claim 8, wherein the estimation module further comprises an incrementation module configured to incrementally estimate a number of unique values in the database when additional data values are added to the database.

11. A system as in claim 8, further comprising a Bloom filter repository in communication with the information server and configured to store the interval specific Bloom filters.

12. A system as in claim 11, wherein the Bloom filter module is further configured to reuse a stored interval specific Bloom filter when additional data values are added to the intervals in the database.

13. A method for estimating unique values in a database, comprising:
storing a data field in the database, the data field comprising a plurality of information values;
partitioning the data field into a plurality of intervals, each interval comprising a range of information values from the plurality of information values;
applying a hash function on an information value in an interval;
evaluating whether a result of the hash function returns a value of zero;
constructing credible sets to determine how many samples to use to determine a unique value;
determining whether the information, value When subjected to a Bloom filter is the unique value based on the result of the hash function returning a value of one;
calculating a false positive probability of the information value being the unique value.

14. A method as in claim 13, further comprising determining the number of bits to include in the Bloom filter.

15. A method as in claim 14, further comprising increasing an available computing memory used by the Bloom filter to increase accuracy of the Bloom filter.

16. A method as in claim 1, further comprising making a statistical inference according to a Bayesian probability approach.

17. A method as in claim 1, further comprising converting each application of the Bloom filter into a series of zeroes and ones, where "1" indicates that a unique value is observed and "0" indicates that an observed sample has already been detected.

18. A method as in claim 17, further comprising modeling outcomes as a binomial random variable.

19. A method as in claim 18, further comprising wherein a yielded posterior distribution is used to construct Bayesian credible sets.

20. A method as in claim 1, further comprising estimating parameters of a beta distribution using moments as inputs to a posterior distribution.

* * * * *

UNITED STATES PATENT AND TRADEMARK OFFICE
CERTIFICATE OF CORRECTION

PATENT NO.         : 8,549,004 B2
APPLICATION NO.    : 12/895683
DATED              : October 1, 2013
INVENTOR(S)        : Choudur Lakshminarayan et al.

It is certified that error appears in the above-identified patent and that said Letters Patent is hereby corrected as shown below:

In the Claims

In column 12, line 61, in Claim 13, delete "information," and insert -- information --, therefor.

In column 12, line 61, in Claim 13, delete "When" an insert -- when --, therefor.

Signed and Sealed this
Tenth Day of December, 2013

Margaret A. Focarino
*Commissioner for Patents of the United States Patent and Trademark Office*